(No Model.)
A. MICHAUD.
GALVANIC BATTERY.
No. 254,676. Patented Mar. 7, 1882.
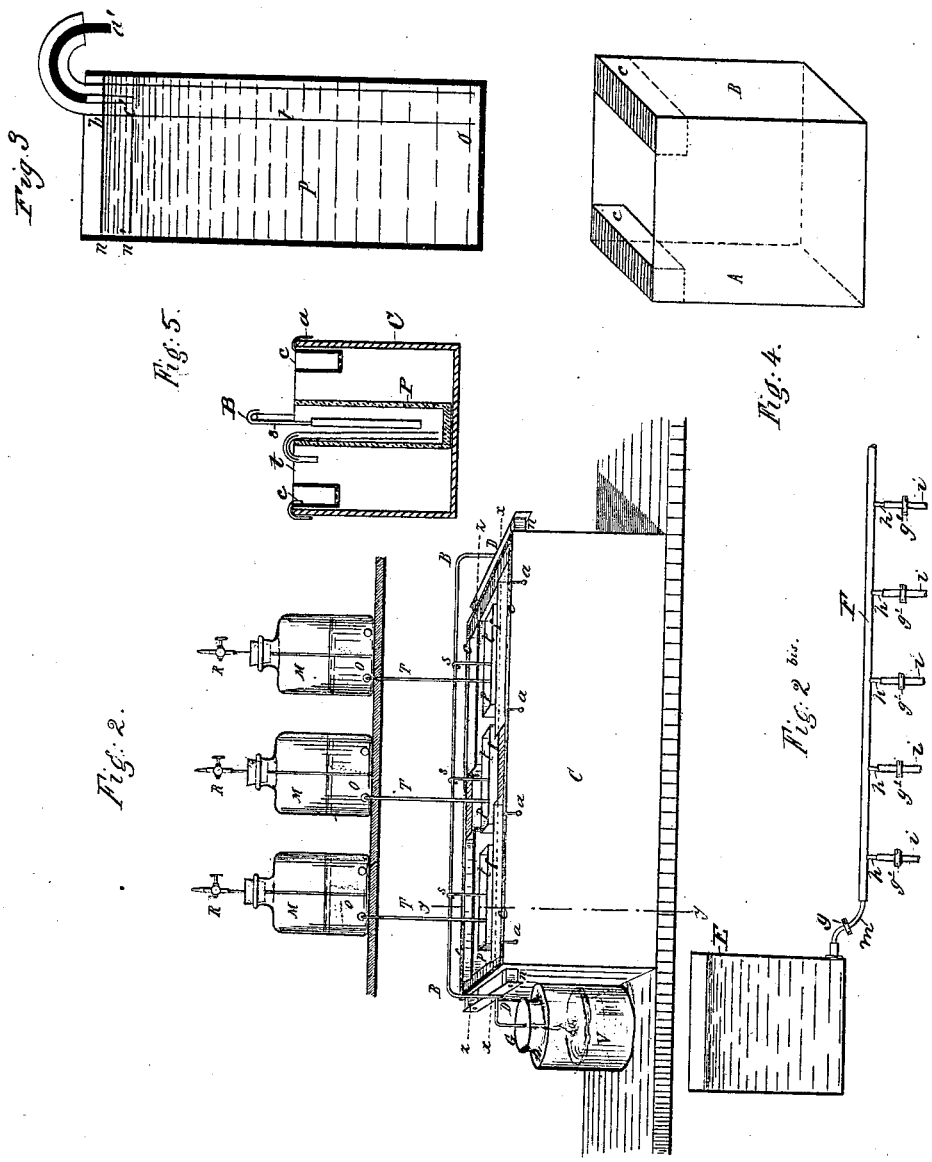
Witnesses:
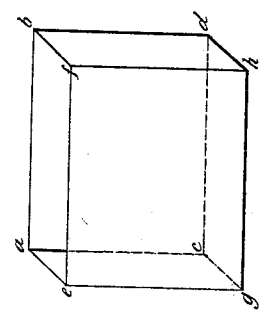
Inventor:

UNITED STATES PATENT OFFICE.

ALFRED MICHAUD, OF PARIS, FRANCE.

GALVANIC BATTERY.

SPECIFICATION forming part of Letters Patent No. 254,676, dated March 7, 1882.

Application filed September 3, 1881. (No model.) Patented in France April 12, 1880, and July 11, 1881, and in England August 26, 1881.

*To all whom it may concern:*

Be it known that I, ALFRED MICHAUD, of Paris, France, have invented a new and Improved Galvanic Battery; and I do hereby declare that the following is a full, clear, and exact description of the same, reference being had to the annexed sheet of drawings, making a part of the same.

My invention relates to a new and improved permanent galvanic vat, hereinafter described.

According to my invention I preferably make use of rectangular porous vessels composed of two plates, made either of common porous earth or of agglomerated carbon or any other plastic clay. The material employed should be capable of resisting the action of acids, should be easily traversed by liquids, and should oppose the lowest possible amount of resistance to the passage of the electric current. These plates $a\ b\ c\ d\ e\ f\ g\ h$, Figure 1, are of any suitable size, and are provided with marginal ribs or with perforations, by means of which they are fixed in a gutta-percha bearing, or in a bearing of varnished wood or any other material capable of resisting acids, so as to form a complete vessel, $a\ e\ g\ c\ h\ d\ f\ b$, having two opposite porous and active faces or sides.

Fig. 2 shows my single vat complete and ready for use, and Fig. 5 is a cross-section of the vat on line $y\ y$ of Fig. 2.

C is a wooden vat, of any size, the outer surface of which is varnished, while its inner surface is coated with a heated acid-resisting mixture of wax, rosin, red ocher, and isinglass. The said vat contains the saline solution, the decomposition of which produces the galvanic current.

$c\ c\ c\ c$ are four small vessels, of gutta-percha, provided with perforated bottoms, and which contain a suitable salt which is dissolved accordingly as the metal of the solution is absorbed, in order to form the article. These small vessels are provided with flanges, which bear upon the edges of the vat and are fixed thereon by copper wires $a\ a\ a\ a$.

B B is a metallic bar, the ends of which are curved at an angle and soldered upon metallic cross-bars D D. The said cross-bars are fixed to the vat C and separated therefrom by small wooden blocks $n\ n$, so that the metallic framing of the vat is, as far as possible, insulated from the substances composing the galvanic vat.

P P P are three rectangular porous vessels, (ordinary cylindrical vats may be used in place of mine in case of need,) placed in the vat, and in which are contained three zinc plates, suspended from the bar B B by means of hooks S S S.

M M M are three Mariotte's flasks, provided near their bottom with tubulures and containing the acid liquid used in the porous vessels. This liquid is carried into said vessels through tubes T T T. Vertical tubes provided with cocks R R R are used for regulating the outflow of the liquid. To effect this it is only necessary to put the tubes T T T in working order by blowing at R, either directly or through an india-rubber pipe, and then to turn the cocks, so as to obtain the amount of flow exactly necessary. This flow of liquid draws into the flasks at O a corresponding quantity of air. This process is continued uninterruptedly as long as any liquid remains in the flasks M M M. The vessels or flasks M M M may be replaced by the contrivance represented in Fig. $2^{bis}$.

E, Fig. $2^{bis}$, is a reservoir, of any desired size, containing the liquid destined for the porous vessels. F is a tube, which may be made of lead and sufficiently long to supply all the vats in the room. This tube communicates with the reservoir A through an india-rubber tube, $m$, furnished with a clamp, $g$, by which the flow of liquid may be completely stopped, and it is also provided with tubulures $h$ communicating with india-rubber tubes $i$, also furnished with metallic clamps $g'$, which control the supply of the liquid to the porous vessels placed opposite the said tubulures.

$t\ t\ t$ are three siphons, which will be hereinafter described. They plunge into the porous vessels and terminate near the bottom of the same. They convey to the vat C the overflowing acid liquid from the said porous vessels, from whence it is conveyed to the jar V through the pipe G, which passes through the upper part of the side of the vat C, and is puttied or cemented therein. It is placed at such a level that the liquid contained in the vat cannot rise to its upper edge, and that the outflow of liquid through the tubes t t t leaves in the porous vessels a volume of liquid sufficient for the proper action of the same.

Fig. 3 shows a detail view of one of the compound siphons t above mentioned. t is a glass tube leading to the bottom of the porous vessel P, filled at n with acid liquid. The said tube t contains in its upper curved part, b, a vulcanized india-rubber pipe, a', provided with a small glass tube, c', the lower end of which is finely pointed, so as to form a capillary inlet. This arrangement, which is one of the features of my invention, is of capital importance. The numerous bubbles produced during the reaction of the liquid contained in the vessel P upon the zinc enter the end O of the tube t, and are liable, after a certain time, to obstruct the action of the same; but as said bubbles cannot pass through the pointed and capillary inlet c they come into the curved part of the large tube t, and escape freely therefrom without interfering with the action of the siphon proper, a b c, which by this means remains independent. In this manner the inner siphon acts regularly and permanently, and its action is varied according to the varying level n n' of the liquid in the porous vessel. Moreover, as this siphon is free to move in the outer tube, its position, and consequently the height of the liquid in the vessel, may be varied when necessary.

The mode of operation of my improved vat is as follows: The galvanic bath is put in the vat, and the vessels c c c c, Fig. 2, are filled with the salt necessary for maintaining the solution in a constant state and at a given degree of concentration. The porous vessels containing a suitable quantity of acid liquid for attacking the zinc plate suspended at s s s are plunged into the baths and the tubes t t t are set to their proper position. The tubes T T T are then put into working order, and the flow of the liquid is suitably regulated through the cocks R R R, at the same time the small siphons t t t are set also in working order by withdrawing the air from the said tubes by means of an enlarged tube, or of an india-rubber ball applied to their ends.

The above description relates to my single galvanic vat or battery, but it may be used as a battery composed of two liquids. The modified arrangement which I have imagined for this purpose is shown at Fig. 4. Each cell of the battery is also formed of a rectangular vat, A B, corresponding in size to the porous vessel. This vat is coated internally with the substance hereinbefore mentioned as being applied to the galvanic vats or single batteries. The opposite sides, A and B, which are narrower than the other sides of the vat, are provided at their upper edges with two small basins, c c, having a perforated bottom. These basins contain the salt necessary for keeping the cupric solution of the battery in a constant state of concentration. The larger sides of the vat are covered with varnish made of gutta-percha dissolved in chloroform or benzine. This varnish, when dry, is coated with plumbago laid on by means of a brush. The porous vessel is then introduced into the vat and the zinc plate is placed in the said vessel in such a manner that its surfaces shall be parallel to the plumbago-coated sides of the vat. The acid-exciting liquid is then poured into the porous vessel, while the cupric solution is placed in the vat A B itself.

In order to set the battery in working order, it is simply necessary to connect the opposite poles of the same and to adapt thereto the siphon device, as aforesaid with reference to the galvanic vat.

By suitably acidulating the liquids used in my battery, and by placing the said battery so that its temperature may be raised at will, uninterrupted galvanic action more powerful than that heretofore obtained will be produced.

By this arrangement, as will be readily understood, the sides of the vat coated with plumbago will become metallized, and the deposited copper plates forming the positive pole of the battery may be removed when necessary.

Care must be taken in forming the electric circuit to place on each of the plumbago-coated sides of the vat a small copper plate. These copper plates are connected by a wire, which constitutes the positive pole of the battery. Moreover, it is obvious that the cupric solution surrounding the porous vessel may be replaced either by bichromate of potash or by the nitric acid used in Bunsen's battery. In these cases the copper plates of the positive pole should be replaced by, say, two carbon plates connected together, as above stated, in order to form a single pole and to utilize both sides of the zinc plate for the production of the electric current. At all events, the siphon device may be used to insure the outflow and the renewal of the liquids.

The principal practical results of my invention are the following:

First. The expense necessary for setting up the apparatus and maintaining it in working order is greatly reduced.

Second. The purity of the galvanic liquids is maintained.

Third. The galvanic actions are regular and uninterrupted and their energy is greatly increased.

Fourth. The manipulation is greatly simplified.

Fifth. An economy of at least fifty per cent. of the salts ordinarily employed is effected.

Sixth. Galvanic articles made of perfectly-pure metal may be obtained at a very low price.

I claim—

1. In a galvanic vat, the combination, with the vat C and the porous vessels P, of the bar B, the metallic plates D, the wooden blocks n, and the hooks s, substantially as shown and described, whereby the zinc plates are suspended in the said porous vessels, as set forth.

2. In a galvanic vat, the combination, with the flasks M and the porous vessels P, of the siphons $t$, provided with the india-rubber pipe $a'$, having a glass tube on its inner end, substantially as and for the purpose set forth.

3. In a galvanic vat, the combination, with the vat C, provided with the overflow-pipe G, the flasks M, and the porous vessels P, of siphons $t$, provided with india-rubber pipes $a'$, having glass tubes on their inner ends, substantially as and for the purpose set forth.

ALFRED MICHAUD.

Witnesses:
 ROBT. M. HOOPER,
 ALBERT MOREAU.